(12) United States Patent
Kim et al.

(10) Patent No.: US 11,965,428 B1
(45) Date of Patent: Apr. 23, 2024

(54) AIRFOIL COOLING STRUCTURE, AIRFOIL HAVING AIRFOIL COOLING STRUCTURE, AND TURBINE BLADE/VANE ELEMENT INCLUDING AIRFOIL

(71) Applicant: DOOSAN ENERBILITY CO., LTD., Changwon (KR)

(72) Inventors: Jeong Ju Kim, Seongnam (KR); Ki Don Lee, Gimhae (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/358,159

(22) Filed: Jul. 25, 2023

(30) Foreign Application Priority Data

Oct. 28, 2022 (KR) .......................... 10-2022-0141719

(51) Int. Cl.
*F01D 5/18* (2006.01)

(52) U.S. Cl.
CPC .......... *F01D 5/18* (2013.01); *F05B 2220/302* (2013.01); *F05B 2260/20* (2013.01)

(58) Field of Classification Search
CPC .................................. F01D 5/18; F01D 5/187
See application file for complete search history.

(56) References Cited

U.S. PATENT DOCUMENTS

| 8,079,821 B2 | 12/2011 | Campbell | |
| 2010/0284798 A1* | 11/2010 | Campbell | F01D 5/147 415/177 |
| 2016/0052057 A1 | 2/2016 | Xu | |
| 2016/0151829 A1 | 6/2016 | Propheter-Hinckley | |
| 2016/0169003 A1* | 6/2016 | Wong | F01D 9/041 415/115 |
| 2018/0347373 A1* | 12/2018 | Snyder | F01D 25/12 |
| 2020/0080796 A1* | 3/2020 | Dasgupta | F28F 7/02 |
| 2020/0191000 A1* | 6/2020 | Pang | F01D 5/189 |
| 2023/0016532 A1* | 1/2023 | Cho | B33Y 10/00 |

FOREIGN PATENT DOCUMENTS

| CN | 106958461 A | 7/2017 |
| CN | 107138726 A | 9/2017 |
| CN | 109538304 A | 3/2019 |
| EP | 2947274 A1 | 11/2015 |
| EP | 3428395 A1 | 1/2019 |
| EP | 3795902 A1 | 3/2021 |
| JP | 5743118 B2 | 7/2015 |
| KR | 101557900 B1 | 10/2015 |

(Continued)

OTHER PUBLICATIONS

EP EESR, dated Jan. 26, 2024.

*Primary Examiner* — Woody A Lee, Jr.
*Assistant Examiner* — Cameron A Corday
(74) *Attorney, Agent, or Firm* — Harvest IP Law, LLP

(57) ABSTRACT

An airfoil cooling structure, an airfoil having the airfoil cooling structure, and a turbine blade/vane element including the airfoil are disclosed. The airfoil cooling structure includes a cooling path formed inside the airfoil and having a first surface and a second surface opposite to the first surface, and an additive manufactured (AM) feature disposed in the cooling path, manufactured by additive manufacturing, and including a plurality of column parts intersecting with each other so as to abut against the first surface and the second surface.

20 Claims, 12 Drawing Sheets

(56) References Cited

FOREIGN PATENT DOCUMENTS

| KR | 20180065728 A | 6/2018 |
| KR | 20190131106 A | 11/2019 |
| KR | 102162970 B1 | 10/2020 |
| KR | 1020220074692 A | 6/2022 |
| KR | 1020220129464 A | 9/2022 |

* cited by examiner

AIRFOIL COOLING STRUCTURE, AIRFOIL HAVING AIRFOIL COOLING STRUCTURE, AND TURBINE BLADE/VANE ELEMENT INCLUDING AIRFOIL

CROSS REFERENCE TO RELATED APPLICATION

The present application claims priority to Korean Patent Application No. 10-2022-0141719, filed on Oct. 28, 2022, the entire contents of which are incorporated herein for all purposes by this reference.

BACKGROUND OF THE INVENTION

1. Field of the Invention

The present disclosure relates to an airfoil cooling structure, an airfoil having the airfoil cooling structure, and a turbine blade/vane element including the airfoil. More particularly, the present disclosure relates to an airfoil cooling structure having an additive manufactured (AM) feature, an airfoil having the airfoil cooling structure, and a turbine blade/vane element including the airfoil

2. Description of the Background Art

Generally, a gas turbine is a combustion engine in which a mixture of air compressed by a compressor and fuel is combusted to produce a high temperature gas that drives a turbine. The gas turbine is used to drive electric generators, aircraft, ships, trains, or the like.

The gas turbine generally includes a compressor, a combustor, and a turbine. The compressor serves to intake external air, compress the air, and transfer the compressed air to the combustor. The compressed air compressed by the compressor has a high temperature and a high pressure. The combustor serves to mix compressed air from the compressor and fuel and combust the mixture of compressed air and fuel to produce combustion gases, which are discharged to the gas turbine. The combustion gases drive turbine blades in the turbine to produce power. The power generated through the above processes is applied to a variety of applications such as generation of electricity, driving of mechanical units, etc.

Recently, in order to increase the efficiency of a turbine, the temperature of the gas flowing into the turbine (Turbine Inlet Temperature: TIT) is continuously increasing, and thus, the importance of heat-resistant treatment and cooling of turbine blades and turbine vanes has been highlighted.

For cooling of turbine blades and turbine vanes, cooling structures may be arranged inside the airfoil. Conventionally, these structures have been produced primarily by a casting method. However, the casting method limits the shape and arrangement of the cooling structures, which in turn limits the cooling performance of the structures.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide an airfoil cooling structure capable of improving both cooling efficiency and production efficiency, an airfoil having the airfoil cooling structure, and a turbine blade/vane element including the airfoil.

In an aspect of the present disclosure, an airfoil cooling structure applied to an airfoil of a turbine blade/vane element includes an additive manufactured (AM) feature disposed in a cooling path formed inside the airfoil, the AM feature manufactured by additive manufacturing and including a plurality of column parts intersecting with each other and configured to contact a first surface and a second surface of the cooling path.

The AM feature and the airfoil may be integrally formed by an additive manufacturing method.

The AM feature may include at least three column parts.

The AM feature may be formed in a radial symmetry shape so as to be symmetrical with respect to a center thereof.

At least one of the column parts may be disposed at an inclination angle with respect to at least one of the first surface and the second surface.

The inclination angle may have a range from 30 degrees to 45 degrees.

The AM feature may be disposed on a trailing edge side of the airfoil.

A plurality of AM features may be arranged in a plurality of rows, wherein the AM features in adjacent rows may be arranged in an alternating manner.

A plurality of AM features may be arranged in a clustered form including a plurality of clusters, wherein each of the plurality of clusters includes at least two AM features.

Each of the plurality of clusters may include a different number of AM features arranged in a different arrangement shape.

In another aspect of the present disclosure, an airfoil includes a suction surface, a pressure surface, a leading edge, and a trailing edge, which are externally formed on the airfoil, a cooling path formed inside the airfoil, and an additive manufactured (AM) feature disposed in the cooling path, manufactured by additive manufacturing, and including a plurality of column parts intersecting with each other and configured to contact a first surface and a second surface of the cooling path.

The AM feature and the airfoil may be integrally formed by an additive manufacturing method.

The AM feature may include at least three column parts.

The AM feature may be formed in a radial symmetry shape so as to be symmetrical with respect to a center thereof.

At least one of the column parts may be disposed at an inclination angle with respect to at least one of the first surface and the second surface.

The inclination angle may have a range from 30 degrees to 45 degrees.

The AM feature may be disposed on a trailing edge side of the airfoil.

A plurality of AM features may be arranged in a plurality of rows, wherein the AM features in two adjacent rows may be arranged in an alternating manner.

A plurality of AM features may be arranged in a clustered form including a plurality of clusters, wherein each of the plurality of clusters includes at least two AM features.

Each of the plurality of clusters may include a different number of AM features arranged in a different arrangement shape.

In a further aspect of the present disclosure, a turbine blade/vane element includes an airfoil including a suction surface, a pressure surface, a leading edge, and a trailing edge, which are externally formed on the airfoil, and a cooling path formed inside the airfoil, and an additive manufactured (AM) feature disposed in the cooling path, manufactured by additive manufacturing, and including a plurality of column parts intersecting with each other so as to abut against a first surface and a second surface of the cooling path.

The airfoil cooling structure, the airfoil having the airfoil cooling structure, and the turbine blade/vane element according to the present disclosure include the AM feature manufactured by additive manufacturing, thereby improving both cooling efficiency and production efficiency.

DETAILED DESCRIPTION OF THE INVENTION

Figure 1:
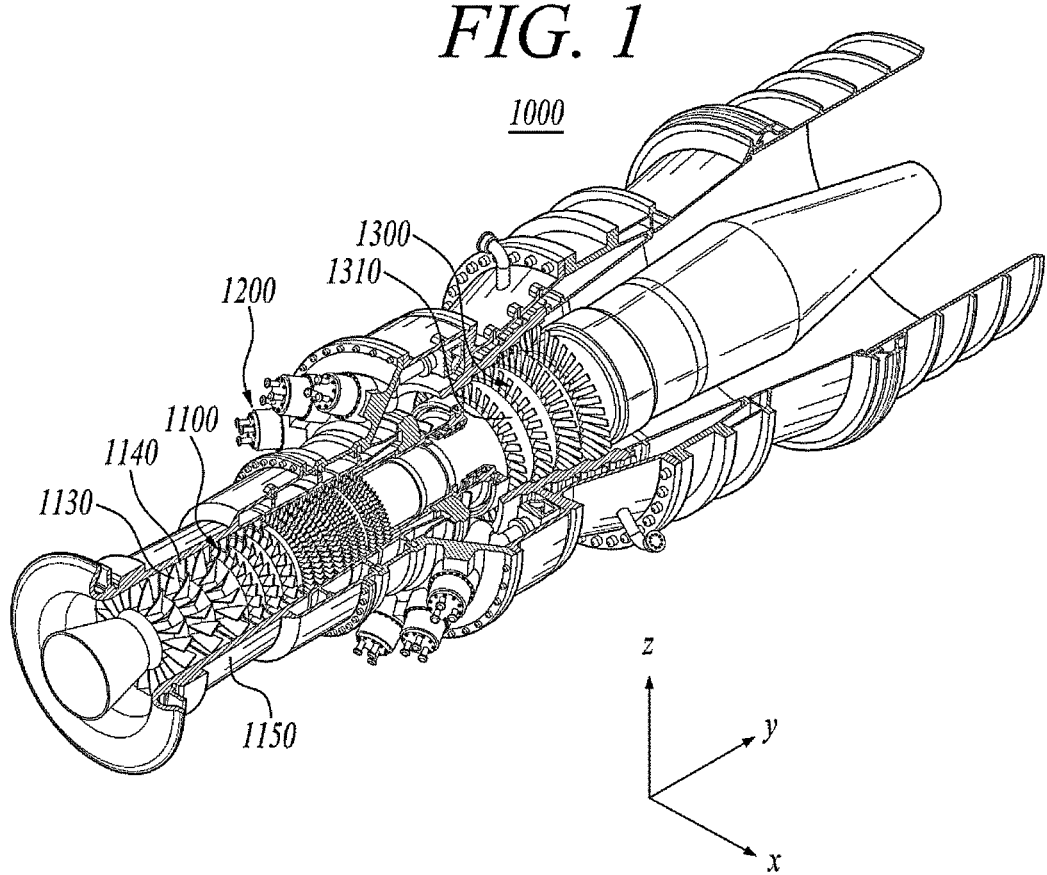
FIG. 1 is a perspective view illustrating the interior of a gas turbine according to an embodiment of the present disclosure.

Hereinafter, exemplary embodiments of the present disclosure will be described in detail with reference to the accompanying drawings. However, it should be noted that the present disclosure is not limited thereto, and may include all modifications, equivalents, or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols whenever possible. Further, the detailed description of known functions and configurations that may obscure the gist of the present disclosure will be omitted. For the same reason, some of the elements in the drawings are exaggerated, omitted, or schematically illustrated.

Hereinafter, an airfoil cooling structure, an airfoil having the airfoil cooling structure, and a turbine blade/vane element including the airfoil according to an embodiment of the present disclosure will be described in detail with reference to the accompanying drawings.

Figure 2:
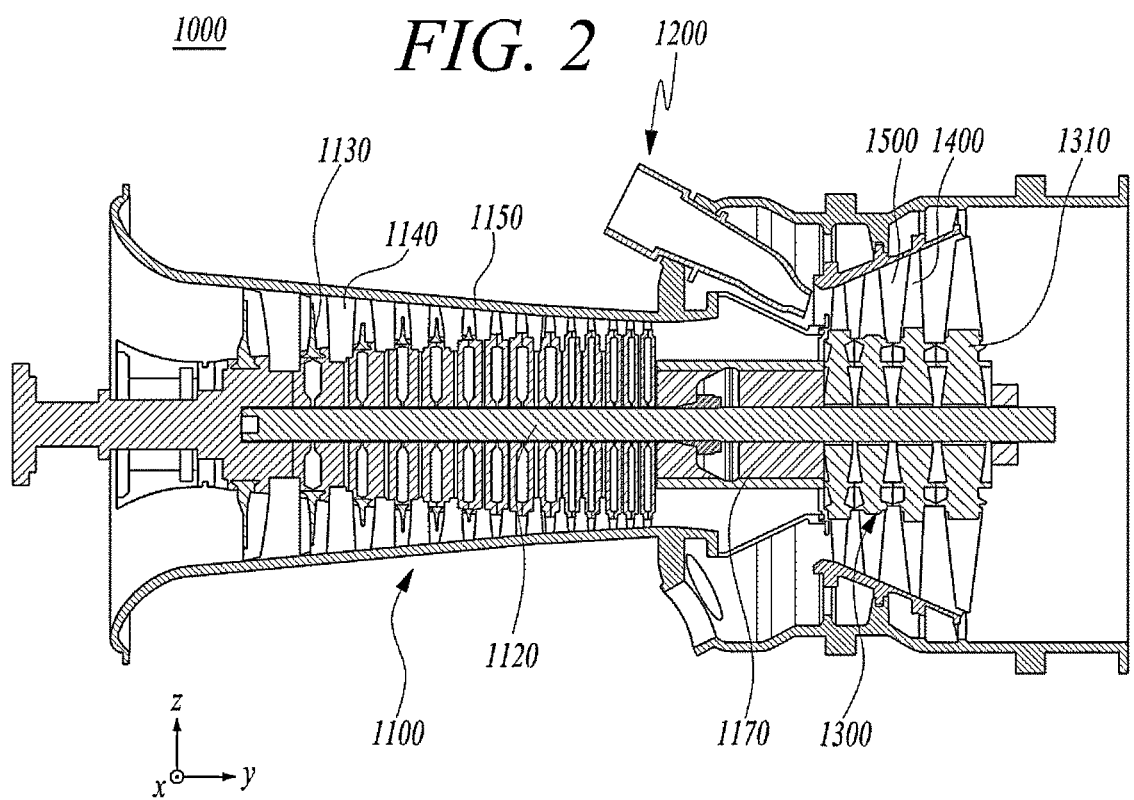
FIG. 2 is a longitudinal-sectional view illustrating a portion of the gas turbine of FIG. 1.

FIG. 1 is a perspective view illustrating the interior of a gas turbine according to an embodiment of the present disclosure, and FIG. 2 is a longitudinal-sectional view illustrating a portion of the gas turbine of FIG. 1.

A gas turbine 1000 according to an embodiment of the present disclosure will now be described with reference to FIGS. 1 and 2. An ideal thermodynamic cycle of the gas turbine 1000 according to the present embodiment follows a Brayton cycle. The Brayton cycle consists of four thermodynamic processes: isentropic compression (adiabatic compression), isobaric combustion, isentropic expansion (adiabatic expansion), and isobaric heat ejection. That is, in the Brayton cycle, atmospheric air is sucked and compressed into high pressure air, mixed gas of fuel and compressed air is combusted at constant pressure to discharge heat energy, heat energy of hot expanded combustion gas is converted into kinetic energy, and exhaust gases containing remaining heat energy are discharged to the outside. That is, gases undergo four thermodynamic processes: compression, heating, expansion, and heat ejection.

As illustrated in FIG. 1, the gas turbine 1000 employing the Brayton cycle includes a compressor 1100, a combustor 1200, and a turbine 1300. Although the following description will be described with reference to FIG. 1, the present disclosure may be widely applied to other turbine engines similar to the gas turbine 1000 illustrated in FIG. 1.

Referring to FIGS. 1 and 2, the compressor 1100 of the gas turbine 1000 may suck and compress air. The compressor 1100 may serve both to supply the compressed air by compressor blades 1130 to a combustor 1200 and to supply the cooling air to a high temperature region of the gas turbine 1000. Here, since the sucked air undergoes an adiabatic compression process in the compressor 1100, the air passing through the compressor 1100 has increased pressure and temperature.

The compressor 1100 is usually designed as a centrifugal compressor or an axial compressor, wherein the centrifugal compressor is applied to a small-scale gas turbine, whereas a multi-stage axial compressor 1100 is applied to a large-scale gas turbine 1000 illustrated in FIG. 1 since the large-scale gas turbine 1000 is required to compress a large amount of air. In this case, in the multi-stage axial compressor 1100, the compressor blades 1130 rotate according to the rotation of the central tie rod 1120 and the rotor disks to compress the introduced air and move the compressed air to the compressor vanes 1140 on the rear stage. As the air passes through the blades 1130 formed in multiple stages, the air is compressed to a higher pressure.

The compressor vanes 1140 are mounted inside the housing 1150 in stages. The compressor vanes 1140 guide the compressed air moved from the front side compressor blades 1130 toward the rear-side blades 1130. In one embodiment, at least some of the compressor vanes 1140 may be mounted so as to be rotatable within a predetermined range for adjustment of an air inflow, or the like.

The compressor 1100 may be driven using a portion of the power output from the turbine 1300. To this end, as illustrated in FIG. 2, the rotary shaft of the compressor 1100 and the rotary shaft of the turbine 1300 may be directly connected by a torque tube 1170. In the case of the large-scale gas turbine 1000, almost half of the output produced by the turbine 1300 may be consumed to drive the compressor 1100.

On the other hand, the combustor 1200 may mix compressed air supplied from the outlet of the compressor 1100 with fuel and combust the air-fuel mixture at a constant pressure to produce a high-energy combustion gas. That is, the combustor 1200 mixes the inflowing compressed air with fuel and combusts the mixture to produce a high-temperature and high-pressure combustion gas with high energy, of which temperature is raised, through an isobaric combustion process, to a temperature that the combustor and turbine parts can withstand without being thermally damaged.

The combustor 1200 may include: a plurality of burners arranged in a housing formed in a cell shape and having a fuel injection nozzle, or the like; a combustor liner forming a combustion chamber; and a transition piece serving as a connection between the combustor and the turbine.

In the meantime, the high-temperature and high-pressure combustion gas from the combustor 1200 is supplied to the turbine 1300. As the supplied high-temperature and high-pressure combustion gas expands, impulse and impact forces are applied to the turbine blades 1400 of the turbine 1300 to generate rotational torque, which is transferred to the compressor 1100 through the torque tube 1170, wherein power exceeding the power required to drive the compressor 1100 is used to drive a generator, or the like.

The turbine 1300 includes a rotor disk 1310, and turbine blades 1400 and turbine vanes 1500 arranged radially on the rotor disk 1310

The rotor disk 1310 has a substantially disk shape, and a plurality of grooves are formed in the outer circumferential portion thereof. The grooves are formed to have a curved surface, and turbine blades 1400 and turbine vanes 1500 are inserted into the grooves. The turbine blades 1400 may be coupled to the rotor disk 1310 using a dovetail coupling method, or the like. The turbine vanes 1500 are fixed so as not to rotate and serve to guide the flow direction of the combustion gas passed through the turbine blades 1400. The turbine blades are rotated by combustion gas to generate a rotary force.

Figure 3:
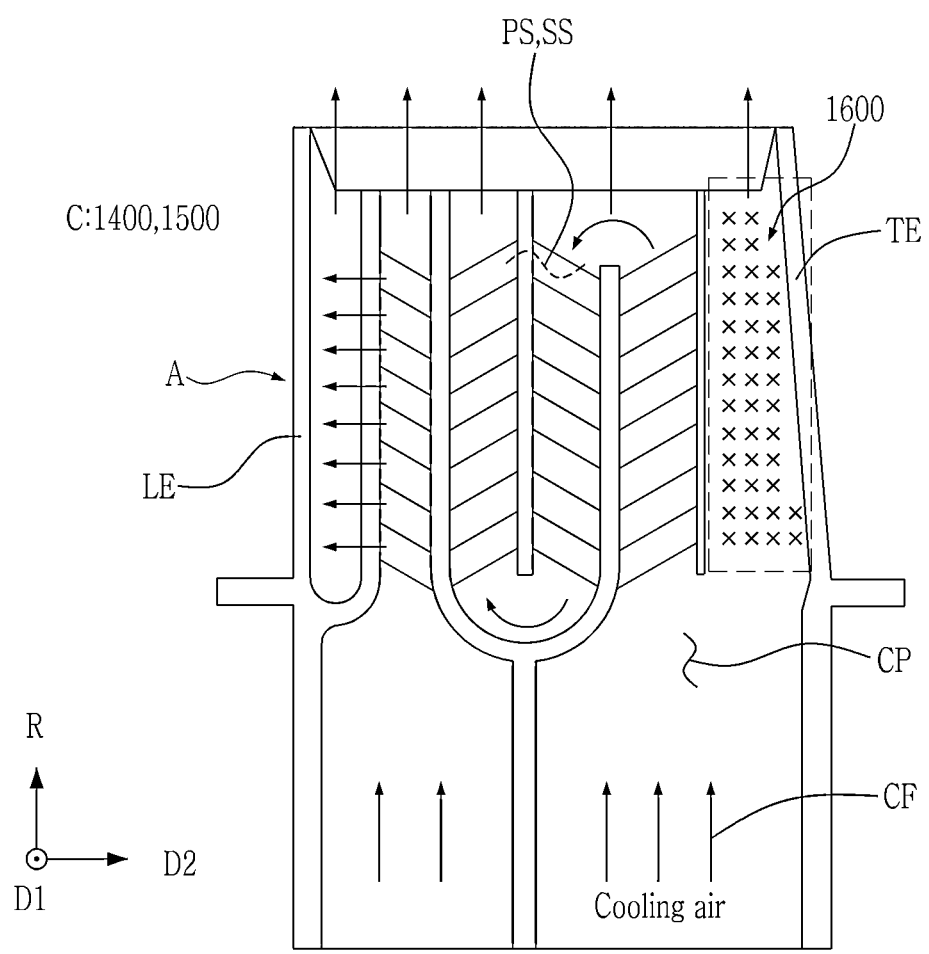
FIG. 3 is a side cross-sectional view illustrating a turbine blade/vane element according to a first embodiment of the present disclosure.
Figure 4:
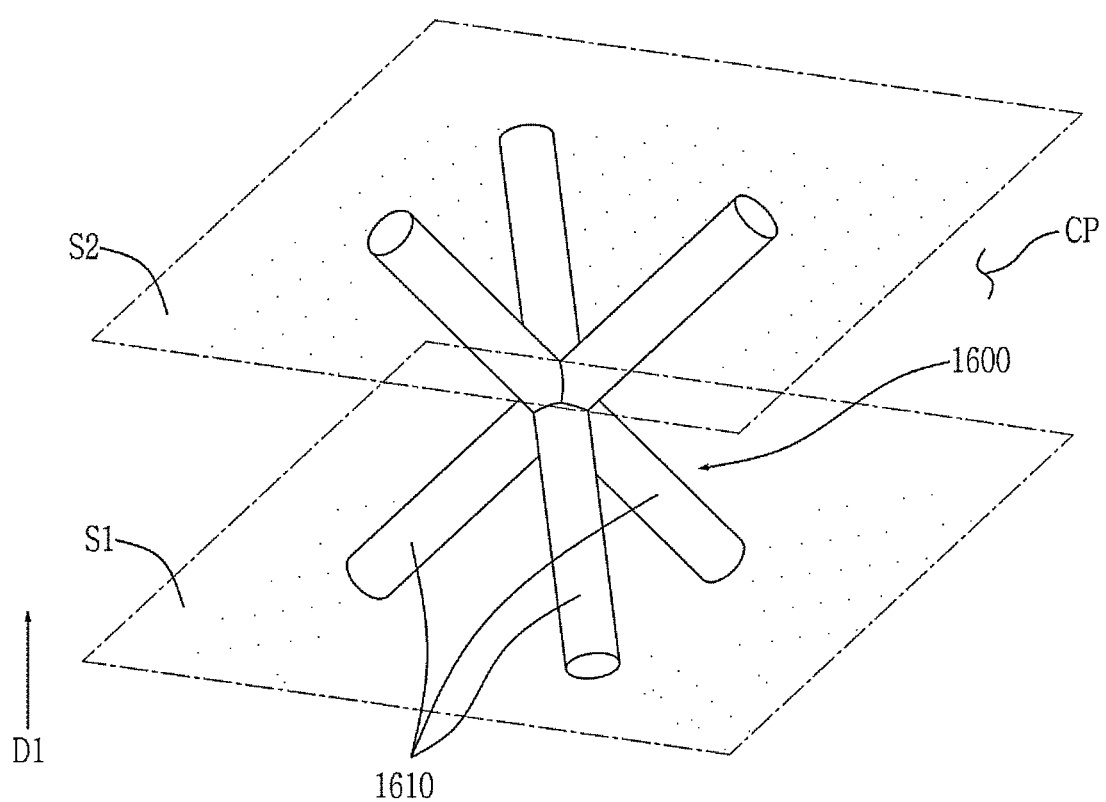
FIG. 4 is a perspective view illustrating an additive manufactured (AM) feature according to a first embodiment of the present disclosure.
Figure 5:
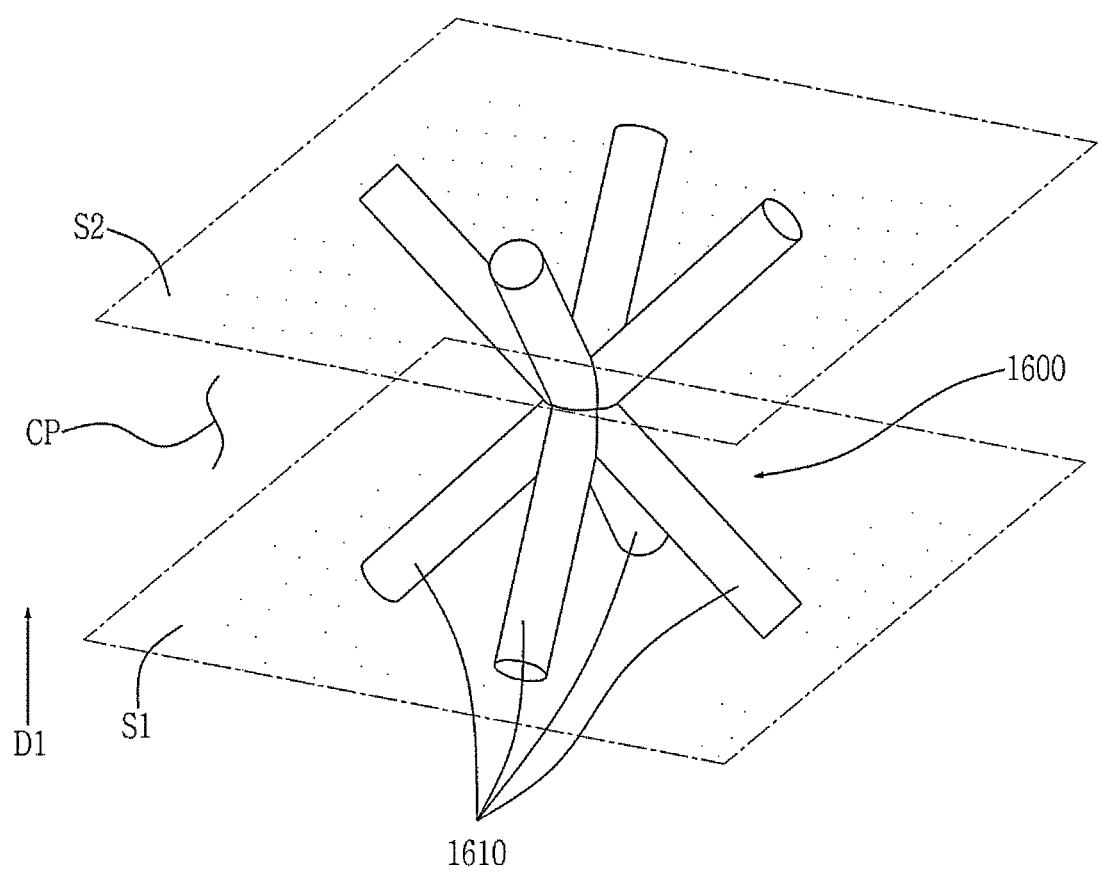
FIG. 5 is a perspective view illustrating an AM feature having another form according to the first embodiment of the present disclosure.
Figure 6:
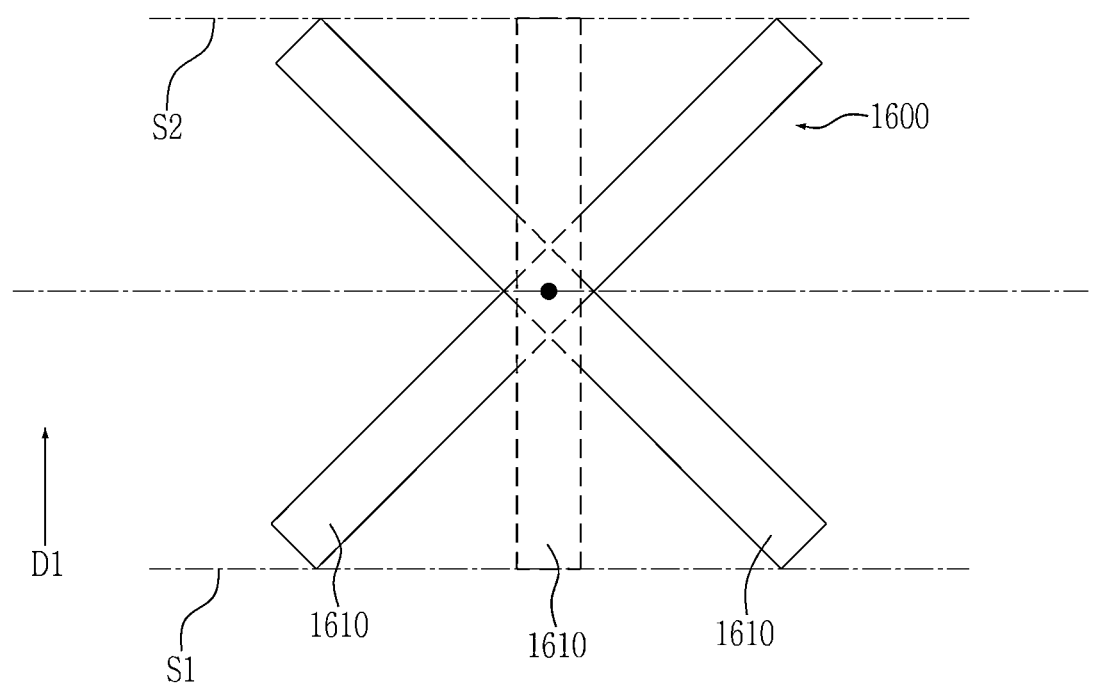
FIG. 6 is a side view illustrating the AM feature according to the first embodiment of the present disclosure.
Figure 7:
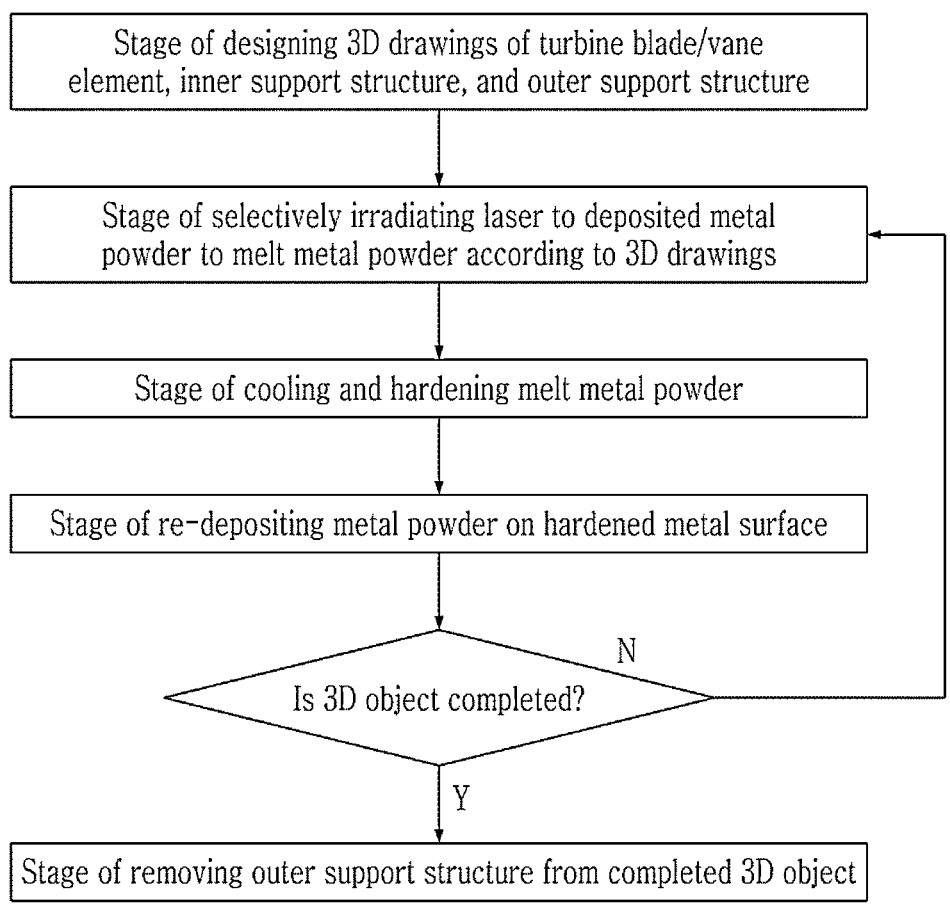
FIG. 7 is a flow chart illustrating an additive manufacturing process of the AM feature according to the first embodiment of the present disclosure.
Figure 8:
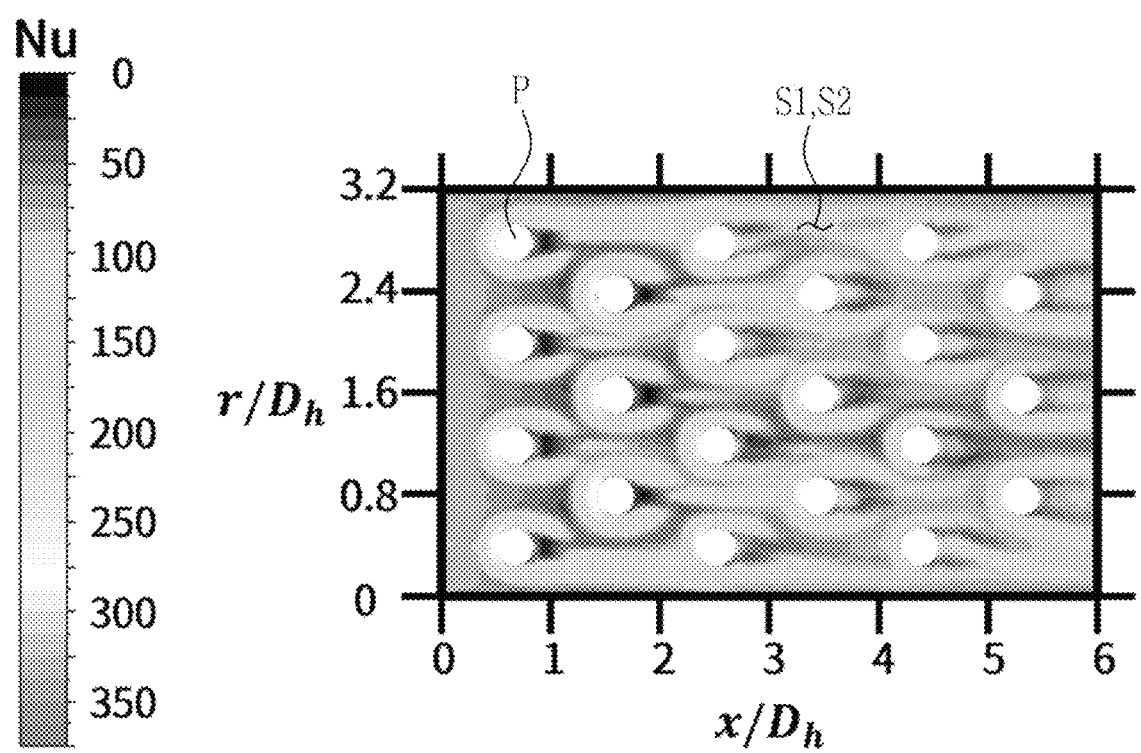
FIG. 8 is a graph showing the heat transfer rate of a conventional cooling structure.
Figure 9:
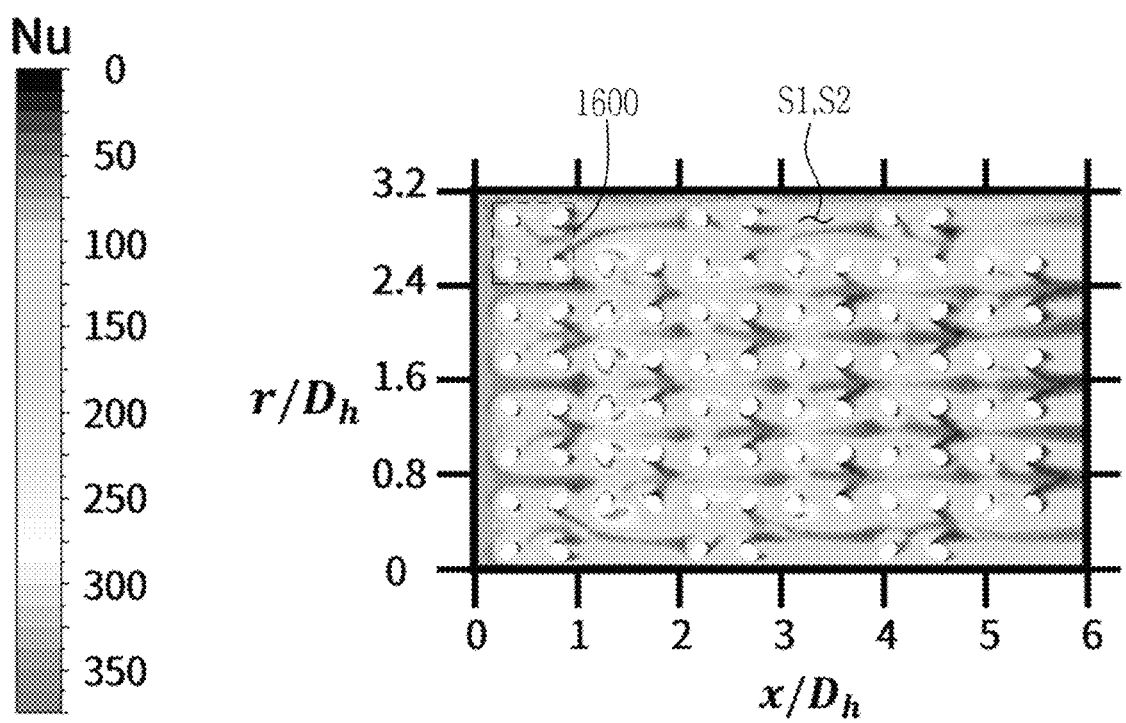
FIG. 9 is a graph showing the heat transfer rate of a cooling structure according to a first embodiment of the present disclosure.
Figure 10:
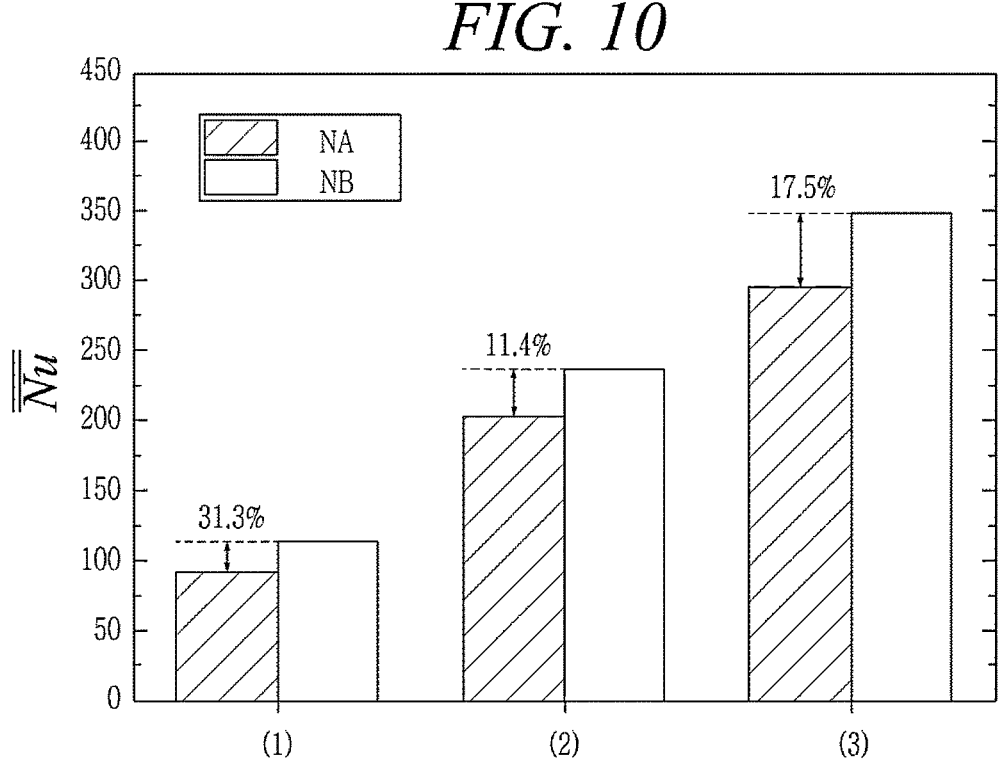
FIG. 10 is a graph showing comparison results of the heat transfer rates between the conventional cooling structure and the cooling structure according to the first embodiment of the present disclosure.

FIG. 3 is a side cross-sectional view illustrating a turbine blade/vane element according to a first embodiment of the present disclosure, FIG. 4 is a perspective view illustrating an additive manufactured (AM) feature according to a first embodiment of the present disclosure, FIG. 5 is a perspective view illustrating an AM feature having another form according to the first embodiment of the present disclosure, FIG. 6 is a side view illustrating the AM feature according to the first embodiment of the present disclosure, FIG. 7 is a flow chart illustrating an additive manufacturing process of the AM feature according to the first embodiment of the present disclosure, FIG. 8 is a graph showing the heat transfer rate of a conventional cooling structure, FIG. 9 is a graph showing the heat transfer rate of a cooling structure according to a first embodiment of the present disclosure, and FIG. 10 is a graph showing comparison results of the heat transfer rates between the conventional cooling structure and the cooling structure according to the first embodiment of the present disclosure.

Hereinafter, with reference to FIGS. 3 through 6, an airfoil cooling structure, an airfoil having the airfoil cooling structure, and a turbine blade/vane element including the airfoil will be described in detail. The turbine blade component C refers to a turbine blade 1400 and/or a turbine vane 1500. That is, the turbine blade/vane element C may refer to both a turbine blade 1400 and a turbine vane 1500, or to any one of the turbine blade 1400 and the turbine vane 1500.

The turbine blade/vane element C includes an airfoil A. That is, the turbine blade 1400 and/or the turbine vane 1500 includes an airfoil A. The airfoil A includes a suction surface SS, a pressure surface PS, a leading edge LE, and a trailing edge TE, which are externally formed. The suction surface SS may be convexly formed toward a front side of the airfoil A on which combustion gases are introduced to the airfoil A. The pressure surface PS may be concavely formed on a rear side of the airfoil A toward the suction surface SS. The leading edge LE is a portion that is formed on the upstream side of a flow of combustion gases which is to be introduced thereto. The trailing edge TE is formed on the downstream side of the flow of combustion gases which exits therefrom.

A cooling path CP is formed inside the airfoil A. A cooling fluid CF flows in the cooling path CP to cool the airfoil A. The cooling fluid CF may be compressed air. An additive manufactured (AM) feature 1600 is disposed in the cooling path CP. Additive Manufacturing is a 3D (three-dimensional) printing technology that creates three-dimensional objects by spraying successive layers of material. This AM technology may be used to manufacture structures with complex shapes.

The AM technology may be generally divided into a modeling state, a printing stage, and a post-processing stage.

In the modeling stage, three-dimensional data is usually completed using CAD (computer aided design) or three-dimensional modeling software, or three-dimensional data may be obtained using a 3D scanner. The standard data interface between CAD and 3D printers usually has a STL (stereolithography) file format, while files generated by 3D scanners usually use a PLY (polygon) file format.

During the printing stage, the 3D printer uses the drawings created during the modeling stage to manufacture an object. Specifically, the 3D printer reads the STL file and creates a virtual cross-section from a CAD model. It then employs layers of material, such as powder, to build the object.

Then, in the post-processing stage, processes such as polishing/coloring/part-assembly may be performed.

The AM feature 1600 refers to a structure manufactured by the AM technique as described above. In the present disclosure, a structure including the cooling path CP of the airfoil A and the AM feature 1600 disposed in the cooling path CP is referred to as a cooling structure of the airfoil A.

Within the airfoil A, a cooling path CP is established, comprising a first surface S1 and a second surface S2. The first surface S1 may be formed either on the suction side SS or on the pressure side PS of the cooling path CP, while the other surface is designated as the second surface S2. The direction from the first surface S1 to the second surface S2 is defined as a first direction D1. The first surface S1 and the second surface S2 are spaced apart and arranged to face each other with the cooling path CP formed therebetween. The AM feature 1600 is disposed in the cooling path CP formed between the first surface S1 and the second surface S2 so as to be disposed to abut against the first surface S1 and the second surface S2.

The AM feature 1600 includes a plurality of column parts 1610. The plurality of column parts 1610 are disposed intersecting each other. As the plurality of column parts 1610 are disposed intersecting each other, the AM feature 1600 may be formed radially as a whole. The AM feature 1600 may exhibit a radial symmetry shape.

The AM feature 1600 may include three column parts 1610, as illustrated in FIG. 4, or four column parts 1610, as illustrated in FIG. 5. Alternatively, although not shown in FIGS. 4 and 5, the AM feature 1600 may include five or more column parts 1610. If the AM feature 1600 includes three or more column parts 1610 as described above, at least one of the column parts 1610 may be arranged to abut against the first surface S1 and the second surface S2. Preferably, all of the column parts 1610 are arranged to abut against the first surface S1 and the second surface S2. If the AM feature 1600 includes three or more column parts 1610, a regular polygon may be formed on the first surface S1 by connecting the vertices created based on the contact points between the first surface S1 and each of the column parts 1610. Similarly, on the second surface S2, contacts between the second surface S2 and each of the column parts 1610 can create a regular polygon.

The AM feature 1600 may be formed in a radial shape with the plurality of column parts 1610 formed to be symmetrical about the center. As used herein, the center refers to an intersection point of the column parts of the AM feature 1600 at a middle height between the first surface S1 and the second surface S2. In other words, the AM feature 1600 may be formed symmetrically in both directions in the first surface S1 and the second surface S2 with respect to the intersection point.

At least one of the column parts 1610 may be inclined to have an inclination angle with the first surface S1 and/or the second surface S2. That is, the column part 1610 may be inclined to have an inclination angle with either the first surface S1 or the second surface S2, or may be inclined to have an inclination angle with both the first surface S1 and the second surface S2. In this case, the inclination angle may have a range from 30 degrees to 45 degrees. If the plurality of column parts 1610 are formed to have an inclined angle with the first surface S1 and/or the second surface S2 as described above, the overhang angle may be overcome during the manufacturing process of the additive manufacturing method described below. In addition, the AM feature 1600 may more reliably support the first surface S1 and the second surface S2, thereby increasing the structural rigidity of the airfoil A.

The AM feature 1600 may be disposed on the trailing edge TE side of the airfoil A. That is, the AM feature 1600 may be disposed in a region of the airfoil A adjacent to the trailing edge TE. The trailing edge TE is one of the most thermally vulnerable and least structurally rigid portions of the airfoil. The AM feature 1600 may be disposed only on the interior side of this trailing edge. This has the advantage of increasing cooling efficiency and structural rigidity of the trailing edge TE portion.

With reference to FIG. 7, the manufacturing process of the AM feature 1600 according to the first embodiment of the present disclosure will now be described in detail. The AM feature 1600 may be fabricated by an additive manufacturing method. Additive manufacturing is a method of building a three-dimensional object by stacking a material layer by layer using equipment such as a 3D printer. Additive manufacturing has the advantage that it can easily produce complex shapes and very thin structures. The AM feature 1600 may be fabricated by a powder bed fusion (PBF) method. The PBF method involves applying metal powder to a bed and irradiating it with a powerful laser to selectively melt and laminate the metal alloy powder. The PBF method is well-suited for enabling mass-production, yielding high-strength products, and fabricating a metallic object.

The manufacturing process of the AM feature 1600 according to the additive manufacturing method is as follows. The first stage is to design a 3D drawing of the turbine blade/vane element C. Here, when designing the 3D drawing of the turbine blade/vane element C, the overhang angle range should be considered. The overhang angle range means the range of angles at which material layers can be stably laminated without the object falling down during the lamination process. If there is a part that is outside the overhang angle range, a support structure should be provided to prevent the object from being falling down. Therefore, when designing the 3D drawing of the turbine blade/vane element C, support structures should be additively designed to the inside and outside of the turbine blade/vane element C.

When the 3D drawing of the turbine blade/vane element C is completed, the metal powder laminated on the bed according to the 3D drawing is selectively irradiated and melted by a laser.

After the metal powder is melted by the laser, it is necessary to cool and harden the melted metal powder. Thus, a hardened metal layer is formed on the surface of the metal powder.

Once the molten metal powder is hardened, the metal powder is again deposited on the surface of the hardened metal. Then, the aforementioned laser irradiation, the molten metal hardening, and the metal powder deposition are repeatedly performed until a three-dimensional object according to the 3D drawing is completed. Through these processes, metal is gradually laminated and hardened, and the 3D object is completed.

Once the 3D object is completed, the outer support structure is removed, but the inner support structure is not removed. The AM feature 1600 may be the inner support structure described above. In this case, utilizing the inner support structure as the AM feature 1600 eliminates the need for additional internal machining. This approach offers the advantage of simplifying the production process, reducing production costs and time, and improving the structural rigidity of the turbine blade/vane element C.

The AM feature 1600 and the airfoil A may be integrally formed with each other by additive manufacturing. That is, the AM feature 1600 and the airfoil A may be formed at the same time during the additive manufacturing process. In this case, there is no gap between the AM feature 1600 and the airfoil A, and the structural rigidity of the airfoil A may be maximized.

Hereinafter, heat transfer rates between a conventional cooling structure and a cooling structure according to the first embodiment of the present disclosure will be described with reference to FIGS. 8 to 10. FIG. 8 illustrates a heat transfer distribution of a conventional cooling structure wherein the cooling structure includes a fin structure P disposed on a first surface S1 or a second surface S2. FIG. 9 is an illustration of a heat transfer distribution of a cooling structure according to a first embodiment of the present disclosure, wherein the cooling structure includes an AM feature 1600 disposed on a first surface S1 or a second surface S2. In FIGS. 8 and 9, Dh is a characteristic length, which may be equal to a distance between the first surface S1 and the second surface S2, x is a coordinate in the direction from the leading edge LE to the trailing edge TE, and r is a coordinate in the radial direction. FIGS. 8 and 9 also illustrate the distribution of the Nusselt (Nu) number. The Nusselt number is a dimensionless number that represents the ratio of the heat transfer rate by convection to the heat transfer rate by conduction, which is a factor indicating the degree of convection. A higher distribution of Nusselt number is shown in FIG. 9 than in FIG. 8, indicating that greater convection occurs in the cooling structure according to the first embodiment of the present disclosure than in the conventional cooling structure.

FIG. 10 illustrates a comparison between an average of Nusselt numbers in the conventional cooling structure and an average of Nusselt numbers in the cooling structure according to the first embodiment of the present disclosure. NA indicates the average of Nusselt numbers of the conventional cooling structure, which is equal to the average value of the distribution of Nusselt numbers illustrated in FIG. 8. NB indicates the average of Nusselt numbers in the cooling structure according to the first embodiment of the present disclosure, which is equal to the average value of the Nusselt number distribution illustrated in FIG. 9. (1) indicates the Nusselt number on the bottom surface, which is the Nusselt number on the first surface S1 or the second surface S2. (2) indicates the Nusselt number of the cooling structure excluding the bottom surface, which is the Nusselt number on the surface of the fin structure P or the AM feature 1600. (3) indicates the Nusselt number on the bottom surface and the Nusselt number of the cooling structure excluding the bottom surface together.

In case of (1), it can be seen that the Nusselt number in the cooling structure according to the first embodiment of the present disclosure is improved by 31.3% compared to the conventional cooling structure. That is, it can be seen that the degree of convection at the bottom surface (first surface S1 or second surface S2) is greater in the cooling structure according to the first embodiment than in the conventional cooling structure. In case of (2), it can be seen that the Nusselt number in the cooling structure according to the first embodiment of the present disclosure is improved by 11.4% compared to the conventional cooling structure. That is, it can be seen that the degree of convection at the surface of the AM feature 1600 is greater than that at the conventional fin structure P. In case of (3), it can be seen that the Nusselt number in the cooling structure according to the first embodiment of the present disclosure is improved by 17.5% compared to the conventional cooling structure. In other words, it can be seen that the degree of convection throughout the cooling structure is greater in the case according to the first embodiment of the present disclosure than in the conventional case.

Figure 11:
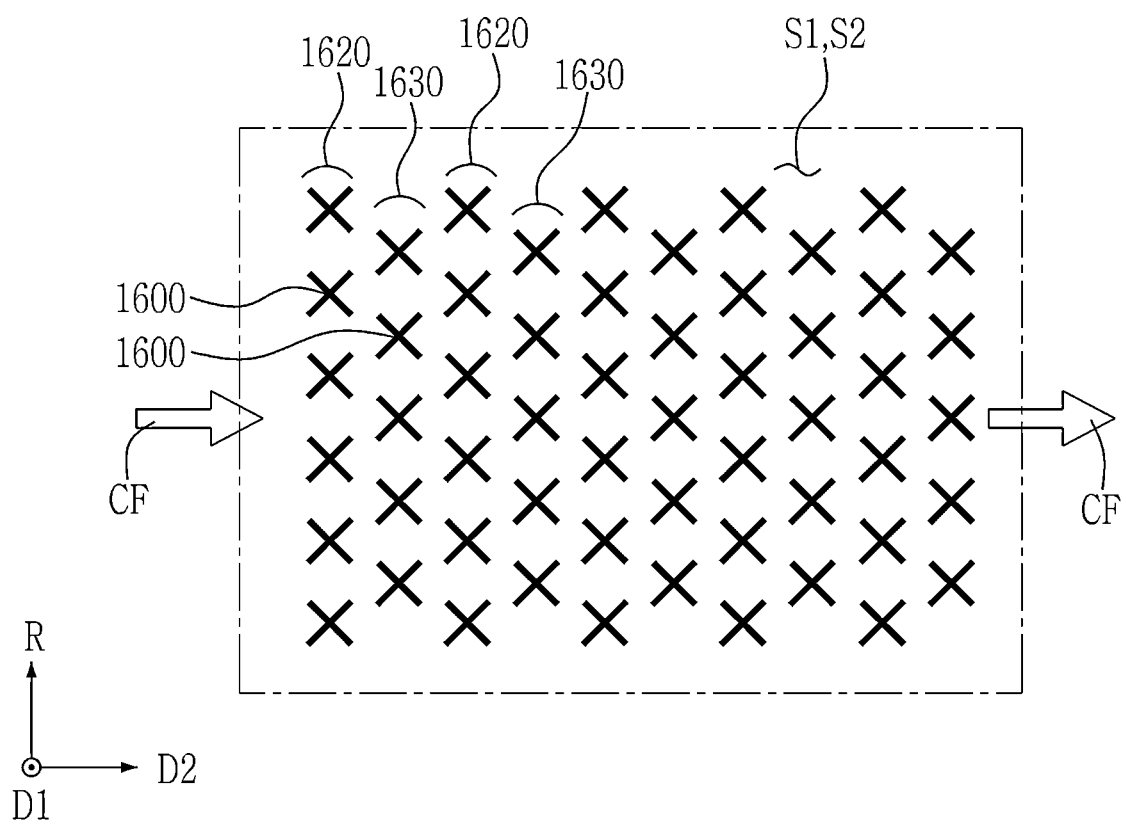
FIG. 11 is a side cross-sectional view illustrating a cooling structure according to a second embodiment of the present disclosure.

FIG. 11 is a side cross-sectional view illustrating a cooling structure according to a second embodiment of the present disclosure. With reference to FIG. 11, an airfoil cooling structure, an airfoil having the airfoil cooling structure, and a turbine blade/vane element including the airfoil according to the second embodiment of the present disclosure will now be described in detail. The airfoil cooling structure, the airfoil, and the turbine blade/vane element according to the second embodiment of the present disclosure differ from the first embodiment of the present disclosure in the arrangement structure of the AM feature 1600. For the sake of simplicity, a redundant description with the first embodiment of the present disclosure will be omitted.

In the airfoil cooling structure, the airfoil, and the turbine blade/vane element according to the second embodiment of the present disclosure, a plurality of AM features 1600 is arranged in a plurality of rows. In two adjacent rows, the AM features 1600 may be arranged alternately with each other. The AM features 1600 may include a first row 1620 and a second row 1630. In the first row 1620 and the second row 1630, the AM features 1600 may be arranged in an elongated manner along a radial direction R. Further, the first row 1620 and the second row 1630 may be repeatedly arranged along a second direction D2, which is perpendicular to the first direction D1 and the radial direction R, and extends in a direction from the leading edge LE to the trailing edge TE. That is, the second row 1630 may be arranged between the first row 1620 and the first row 1620, and the first row 1620 may be arranged between the second row 1630 and the second row 1630. Here, the AM features 1600 of the first row 1620 and the AM features 1600 of the second row 1630 may be disposed alternately with each other when viewed from the second direction D2. Here, the cooling fluid CF flows sequentially through the alternating AM features 1600. In this case, the cooling performance and structural rigidity of the airfoil A may be further improved.

Figure 12:
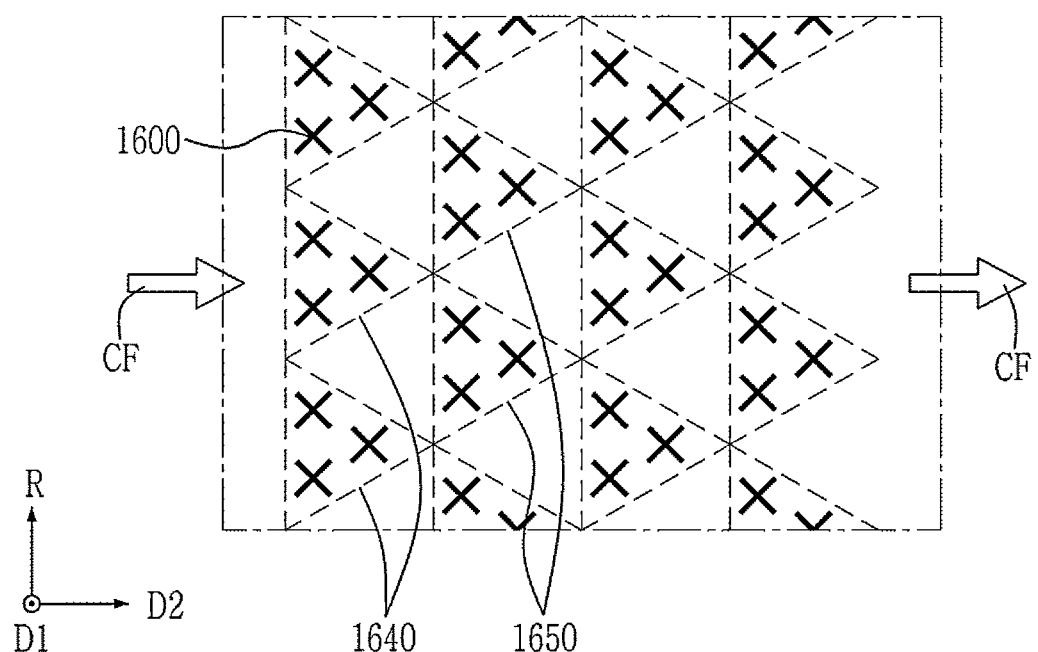
FIG. 12 is a side cross-sectional view illustrating a cooling structure according to a third embodiment of the present disclosure.

FIG. 12 is a side cross-sectional view illustrating a cooling structure according to a third embodiment of the present disclosure. With reference to FIG. 12, an airfoil cooling structure, an airfoil having the airfoil cooling structure, and a turbine blade/vane element including the airfoil according to the third embodiment of the present disclosure will now be described in detail. The airfoil cooling structure, the airfoil, and the turbine blade/vane element according to the third embodiment of the present disclosure differ from the first embodiment of the present disclosure in the arrangement structure of the AM feature 1600. For the sake of simplicity, a redundant description with the first embodiment of the present disclosure will be omitted.

In the airfoil cooling structure, the airfoil, and the turbine blade/vane element according to the second embodiment of the present disclosure, the AM features 1600 are arranged in a clustered form. The AM features 1600 may be arranged in a clustered form including a plurality of clusters. Each cluster may include at least two AM features 1600. The AM features 1600 may be arranged in a clustered form including e.g., a first cluster 1640 and a second cluster 1650. The first cluster 1640 and second cluster 1650 may be arranged sequentially along the second direction D2. The first cluster 1640 and second cluster 1650 may be arranged alternately when viewed from the second direction. The first cluster 1640 and the second cluster 1650 may each include two or more AM features 1600. In each of the first cluster 1640 and second cluster 1650, the AM features 1600 may be arranged in a triangular shape or a polygonal shape. In the first cluster 1640 and second cluster 1650, different numbers of AM features 1600 may be included in different arrangement shapes. Further, the AM features 1600 may be arranged in a clustered form that includes not only the first cluster 1640 and second cluster 1650, but also a larger number of clusters. Here, the cooling fluid CF flow sequentially through clusters. In this case, the cooling performance and structural rigidity of the airfoil A may be further improved.

While the embodiments of the present disclosure have been described, they are by way of example only, and the invention is not limited thereto, but should be construed as having the widest possible scope according to the basic idea disclosed herein. Those skilled in the art may combine or substitute the disclosed embodiments to implement embodiments not disclosed, without departing from the scope of the present invention. In addition, those skilled in the art may readily make changes or modifications to the disclosed embodiments based on this specification, and it is clear that such changes or modifications also fall within the scope of the present invention.

What is claimed is:

1. An airfoil cooling structure comprising:
   a cooling path formed by a first surface and a second surface opposite to the first surface; and
   an additive manufactured (AM) feature disposed in the cooling path, manufactured by additive manufacturing, and comprising a plurality of column parts intersecting with each other and configured to contact the first surface and the second surface,
   wherein each of the plurality of column parts is formed in a cylinder shape and includes a first end face and a second end face disposed opposite to each other and a circumferential surface disposed between the first end face and the second end face, and each of the first end face and the second end face is substantially perpendicular to the circumferential surface.

2. The airfoil cooling structure according to claim 1, wherein the AM feature and the cooling path are integrally formed by an additive manufacturing method.

3. The airfoil cooling structure according to claim 1, wherein the AM feature comprises at least three column parts.

4. The airfoil cooling structure according to claim 1, wherein the AM feature is formed in a radial symmetry shape so as to be symmetrical with respect to a center thereof.

5. The airfoil cooling structure according to claim 1, wherein at least one of the column parts is disposed at an inclination angle with respect to at least one of the first surface and the second surface.

6. The airfoil cooling structure according to claim 5, wherein the inclination angle has a range from 30 degrees to 45 degrees.

7. The airfoil cooling structure according to claim 1, wherein the AM feature is disposed on a downstream side of the cooling path.

8. The airfoil cooling structure according to claim 1, wherein the AM feature includes a plurality of AM features arranged in a plurality of rows, wherein the plurality of AM features in two adjacent rows of the plurality of rows are arranged in an alternating manner.

9. The airfoil cooling structure according to claim 1, wherein the AM feature includes a plurality of AM features arranged in a clustered form comprising a plurality of clusters, wherein each of the plurality of clusters includes at least two AM features from the plurality of AM features.

10. An airfoil comprising:
    a suction surface, a pressure surface, a leading edge, and a trailing edge, which are externally formed on the airfoil;
    a cooling path formed inside the airfoil and having a first surface and a second surface opposite to the first surface; and
    an additive manufactured (AM) feature disposed in the cooling path, manufactured by additive manufacturing, and comprising a plurality of column parts intersecting with each other and configured to contact the first surface and the second surface,
    wherein each of the plurality of column parts is formed in a cylinder shape and includes a list end face and a second end face disposed opposite to each other and a circumferential surface disposed between the first end face and the second end face, and each of the first end face and the second end face is substantially perpendicular to the circumferential surface.

11. The airfoil according to claim 10, wherein the AM feature and the cooling path are integrally formed by an additive manufacturing method.

12. The airfoil according to claim 10, wherein the AM feature comprises at least three column parts.

13. The airfoil according to claim 10, wherein the AM feature is formed in a radial symmetry shape so as to be symmetrical with respect to a center thereof.

14. The airfoil according to claim 10, wherein at least one of the column parts is disposed at an inclination angle with respect to at least one of the first surface and the second surface.

15. The airfoil according to claim 14, wherein the inclination angle has a range from 30 degrees to 45 degrees.

16. The airfoil according to claim 10, wherein the AM feature is disposed on a trailing edge side of the airfoil.

17. The airfoil according to claim 10, wherein the AM feature includes a plurality of AM features arranged in a plurality of rows, wherein the plurality of AM features in two adjacent rows of the plurality of rows are arranged in an alternating manner.

18. The airfoil according to claim 10, wherein the AM feature includes a plurality of AM features arranged in a clustered form comprising a plurality of clusters, wherein each of the plurality of clusters includes at least two AM features from the plurality of AM features.

19. The airfoil cooling structure according to claim 9, wherein each of the plurality of clusters forms a triangular shape, and at least two sides of the triangular shape are in contact with spaces in the cooling path where the AM feature is not installed.

20. The airfoil according to claim 18, wherein each of the plurality of clusters forms a triangular shape, and at least two sides of the triangular shape are in contact with spaces in the cooling path where the AM feature is not installed.

* * * * *